(12) United States Patent
Kikuya (10) Patent No.: US 7,414,206 B2
(45) Date of Patent: Aug. 19, 2008

(54) CONTROL PANEL FOR VEHICLE AIR CONDITIONER

(75) Inventor: Kazuhiro Kikuya, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 215 days.

(21) Appl. No.: 11/335,751

(22) Filed: Jan. 20, 2006

(65) Prior Publication Data
US 2006/0163045 A1 Jul. 27, 2006

(30) Foreign Application Priority Data
Jan. 25, 2005 (JP) ............................. 2005-016425
Jan. 25, 2005 (JP) ............................. 2005-016428

(51) Int. Cl.
*H01H 9/26* (2006.01)
(52) U.S. Cl. ..................... 200/5 R; 200/11 R
(58) Field of Classification Search ............... 200/11 R, 200/5 R, 566
See application file for complete search history.

(56) References Cited

U.S. PATENT DOCUMENTS 5,747,704 A * 5/1998 van der Pol ............ 73/861.357

| 6,521,848 | B2 * | 2/2003 | Shibata et al. ............... 200/5 R |
| 6,978,629 | B2 * | 12/2005 | Yoshida et al. ................. 62/150 |
| 7,202,428 | B2 * | 4/2007 | Ogawa et al. ................ 200/308 |
| 7,246,656 | B2 * | 7/2007 | Ichishi et al. ................ 165/202 |
| 2002/0063046 | A1 * | 5/2002 | Shibata et al. ............... 200/5 R |
| 2004/0089005 | A1 * | 5/2004 | Ichishi et al. ................. 62/214 |
| 2005/0098642 | A1 * | 5/2005 | Ogawa et al. ................. 237/12 |
| 2005/0284741 | A1 * | 12/2005 | Suzuki ........................ 200/310 |
| 2006/0162166 | A1 * | 7/2006 | Van Der Meer et al. ...... 30/34.2 |
| 2007/0131852 | A1 * | 6/2007 | Welch .................... 250/231.13 |
| 2007/0256912 | A1 * | 11/2007 | Shiroyama et al. ............. 200/4 |

FOREIGN PATENT DOCUMENTS

JP 2001-097027 A 4/2001

* cited by examiner

*Primary Examiner*—Michael A Friedhofer
*Assistant Examiner*—Lisa N Klaus
(74) *Attorney, Agent, or Firm*—Foley & Lardner LLP (57) ABSTRACT

A control panel for a vehicle air conditioner includes a dial configured to be turned to change a setting of an object selected from among a plurality of objects.

A control panel for a vehicle air conditioner includes a switch configured to be pushed to change a setting of an object, a display adjacent to the switch, and an arrow formed on the display and configured to be turned on/off to point the switch.

11 Claims, 13 Drawing Sheets

(NORMAL SCREEN)

1 PUSH ⇒

(TEMPERATURE SCREEN)

1 PUSH (OUTLET SCREEN)

1 PUSH (FLOW RATE SCREEN)

1 PUSH

FIG.10B
COMPRESSOR OFF (MANUAL MODE)

FIG.10A
COMPRESSOR ON (MANUAL MODE)

FIG.13

CONTROL PANEL FOR VEHICLE AIR CONDITIONER

CROSS REFERENCE TO RELATED APPLICATIONS AND INCORPORATION BY REFERENCE

This application is based upon and claims the benefit of priority from the prior Japanese Patent Applications No. 2005-016425 and No. 2005-016428, each filed on 25 Jan. 2005; the entire contents of which are incorporated herein by reference.

BACKGROUND OF THE INVENTION

1. Field of the Invention

The present invention relates to a control panel for a vehicle air conditioner.

2. Description of Related Art

A vehicle air conditioner receives signals from sensors and a control panel, and according to the signals, controls out inlet port switching, outlet port switching, air flow rate, air temperature, and the like.

An example of the control panel is disclosed in Japanese Unexamined Patent Application Publication No. 2001-97027. This control panel has a display, an AUTO switch, a temperature adjust dial, a fan switch, an outlet port select switch, a REC switch, a FRE switch, a DEF switch, an AC switch, and an OFF switch.

SUMMARY OF THE INVENTION

When changing the setting of, for example, an outlet port or an air flow rate from one to another among three or more options, the control panel forces an operator to push the corresponding switch several times. This is troublesome.

To improve the operability of the control panel, the control panel is provided with a dial for every adjustment that involves three or more options. The adjustments involving three or more options include, for example, an air temperature adjustment, an air flow rate adjustment, and an outlet port switching adjustment. Unlike a switch, the dial enables a bidirectional operation, such as an up-down operation. In addition, the dial allows an operator to quickly change a set value by turning the dial, thereby improving operability. Arranging a dial for every adjustment, however, increases the size of the control panel.

The control panel of the related art has a light emitting indicator (for example, a light emitting diode) for each switch, to indicate the state (for example, ON/OFF state) of the switch. These indicators increase the cost of the control panel, as the number of the indicators increases.

An object of the present invention is to provide a control panel that is compact and permits good operability.

Another object of the present invention is to provide a control panel that reduces the number of light emitting indicators to reduce the cost of the control panel.

In order to accomplish the objects, an aspect of the present invention provides a control panel for a vehicle air conditioner, having a dial configured to be turned to change the state of an object selected from among a plurality of objects.

Another aspect of the present invention provides a control panel for a vehicle air conditioner, having a switch configured to be pushed to change a setting of an object, a display adjacent to the switch, and an arrow indicator formed on the display and configured to be turned on/off to point to the switch.

BRIEF DESCRIPTION OF THE DRAWINGS

FIGS. 5A and 5B show a main part of a display of the control panel, in which

DETAILED DESCRIPTION OF EMBODIMENTS

Embodiments of the present invention will be explained with reference to the drawings.

Figure 1:
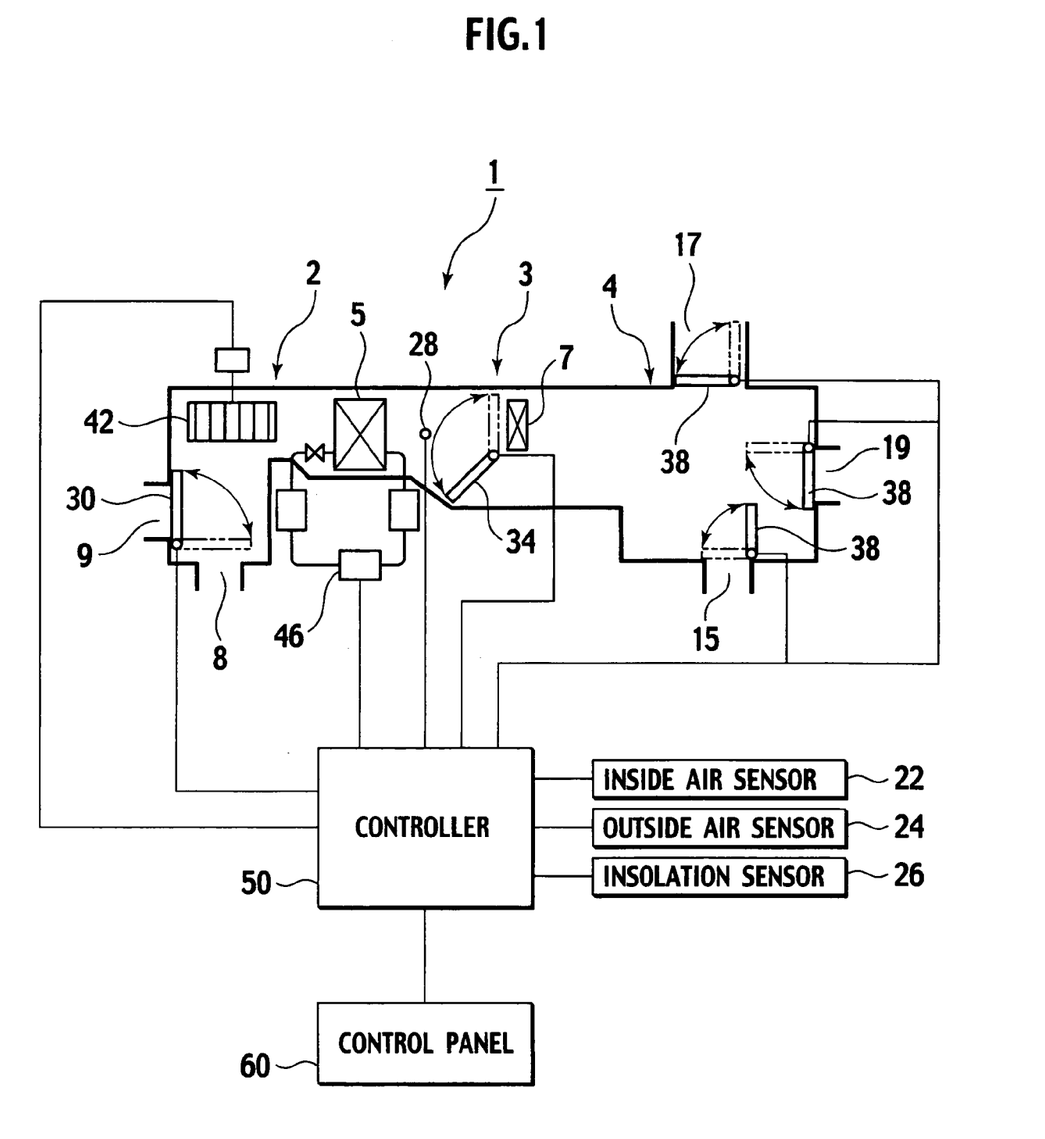
FIG. 1 is a general view showing a vehicle air conditioner.

FIG. 1 shows a vehicle air conditioner. The air conditioner includes an air conditioning unit 1, a controller 50 for controlling the operation of the air conditioning unit 1, and the control panel 60.

Air Conditioning Unit

The air conditioning unit 1 has an intake unit 2 to take air from the inside or outside of a passenger compartment of the vehicle, a temperature adjust unit 3 to adjust the temperature of the air from the intake unit 2, and an air passage unit 4 to guide the temperature-adjusted air into the passenger compartment.

The intake unit 2 includes a fresh air inlet 9 to take fresh air from the outside of the passenger compartment, an inside air inlet 8 to take air from the inside of the passenger compartment, an intake door 30 to open/close the fresh air inlet 9 and inside air inlet 8, and a fan 42. The fan 42 is driven to take air from the fresh air inlet 9 or inside air inlet 8 through the intake unit 2 and into the temperature adjust unit 3.

The temperature adjust unit 3 accommodates an evaporator 5 serving as a cooling heat exchanger, a heater core 7 serving as a heating heat exchanger, and an air mix door 34 serving as a temperature adjuster.

The evaporator 5 is an element of a refrigeration cycle and is a cooler that circulates a coolant which provides evaporation heat to cool air passing through the cooler. The heater core 7 circulates high-temperature water as a coolant for an engine of the vehicle, and to heat air passing along the heater core 7. The air mix door 34 adjusts its opening to control the rate of hot air passing through the heater core 7 and cool air bypassing the heater core 7, thereby adjusting the temperature of a mixture of the hot air and cool air to a required value.

The air passage unit 4 includes a vent outlet 17 to blow the temperature-adjusted air toward the upper half of a passenger in the vehicle, a defrost outlet 19 to blow the air toward a front window of the vehicle, and a foot outlet 15 to blow the air toward the feet of the passenger in the vehicle. The outlets 15, 17, and 19 are provided with mode doors (vent door 38, defrost door 38, and foot door 38), respectively, to adjust air flow rates at the outlets and establish a required outlet mode.

The air conditioning unit 1 of the above-mentioned configuration is controlled by the controller 50.

Controller

Figure 2:
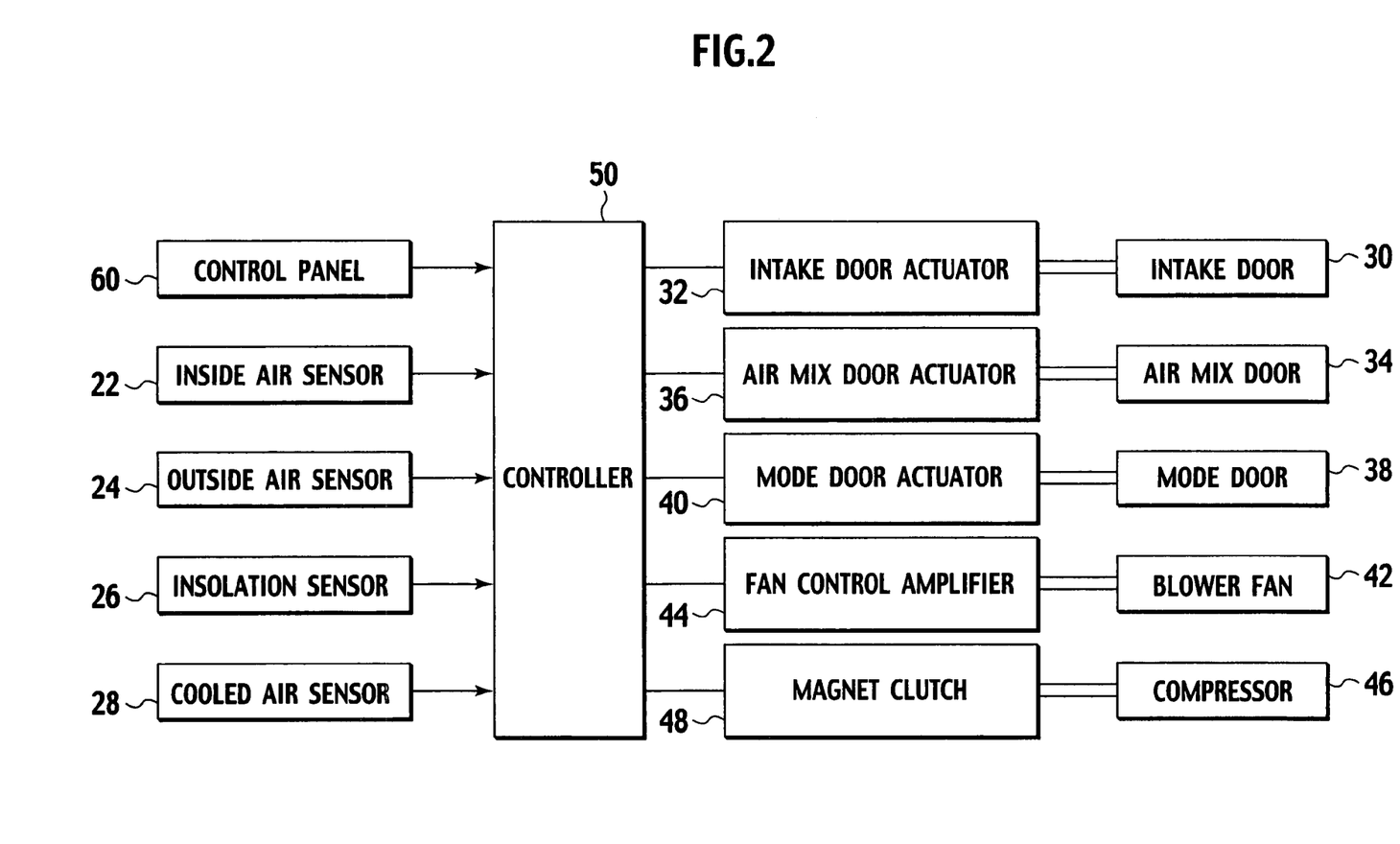
FIG. 2 is a block diagram showing a control system of the air conditioner.

FIG. 2 is a block diagram showing a control system of the air conditioner.

In FIGS. 1 and 2, an input side of the controller 50 is connected to the control panel 60 and sensors 22, 24, 26, and 28. The control panel 60 issues various instructions to set an outlet air temperature, an air flow rate, and the like. The inside air sensor 22 detects the temperature of air inside the passenger compartment of the vehicle. The outside air sensor 24 detects the temperature of fresh air outside the passenger compartment. The insolation sensor 26 detects insolation outside the vehicle, and the cooled air sensor 28 detects the temperature of air just passed the evaporator 5.

An output side of the controller 50 is connected to an intake door actuator 32 for the intake door 30, an air mix door actuator 36 for the air mix door 34, a mode door actuator 40 for the mode doors 38, a fan control amplifier 44 for the blower fan 42, and a magnet clutch 48 for a compressor 46. The intake door actuator 32 turns the intake door 30 that adjust a ratio between inside air and fresh air. The air mix door actuator 36 turns the air mix door 34 that adjusts a mixing ratio of cool air and hot air. The door actuator 40 turns the mode doors 38. The fan control amplifier 44 controls a voltage applied to the fan 42. The clutch 48 starts or stops the compressor 46 of the refrigeration cycle, to start or stop the circulation of coolant through the evaporator 5 of the refrigeration cycle.

According to an instruction signal from the control panel 60 and detected signals from the sensors 22 to 28, the controller 50 controls the air conditioning unit 1 and displays information on a display (FIG. 4) of the control panel 60.

The air conditioner is operated in an automatic mode or a manual mode. In the automatic mode, an operator sets a desired temperature with the control panel 60, and then, the controller 50 automatically provides the set temperature by controlling the actuators 32, 36, and 40, the amplifier 44, and the clutch 48 according to detected signals from the sensors 22, 24, 26, and 28. Namely, in the automatic mode, the controller 50 automatically controls the inlet, air temperature, outlet, air flow rate, and the start and stop of the compressor 46. On the other hand, in the manual mode, the controller 50 maintains manually selected values (inlet, air temperature, outlet, air flow rate, the start and stop of the compressor 46).

Control Panel

Figure 3:
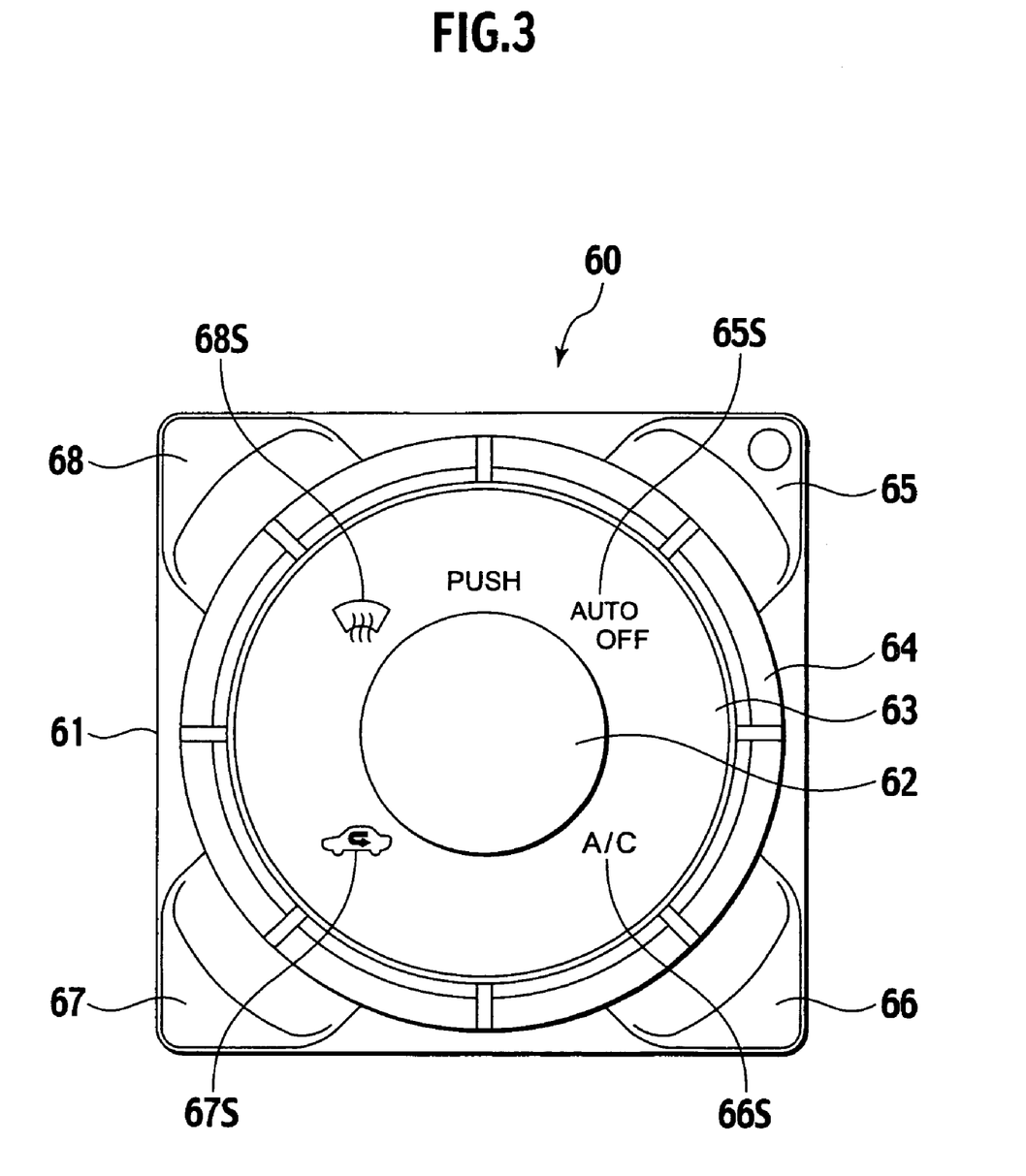
FIG. 3 is a front view showing an OFF state of a control panel of the air conditioner.
Figure 4:
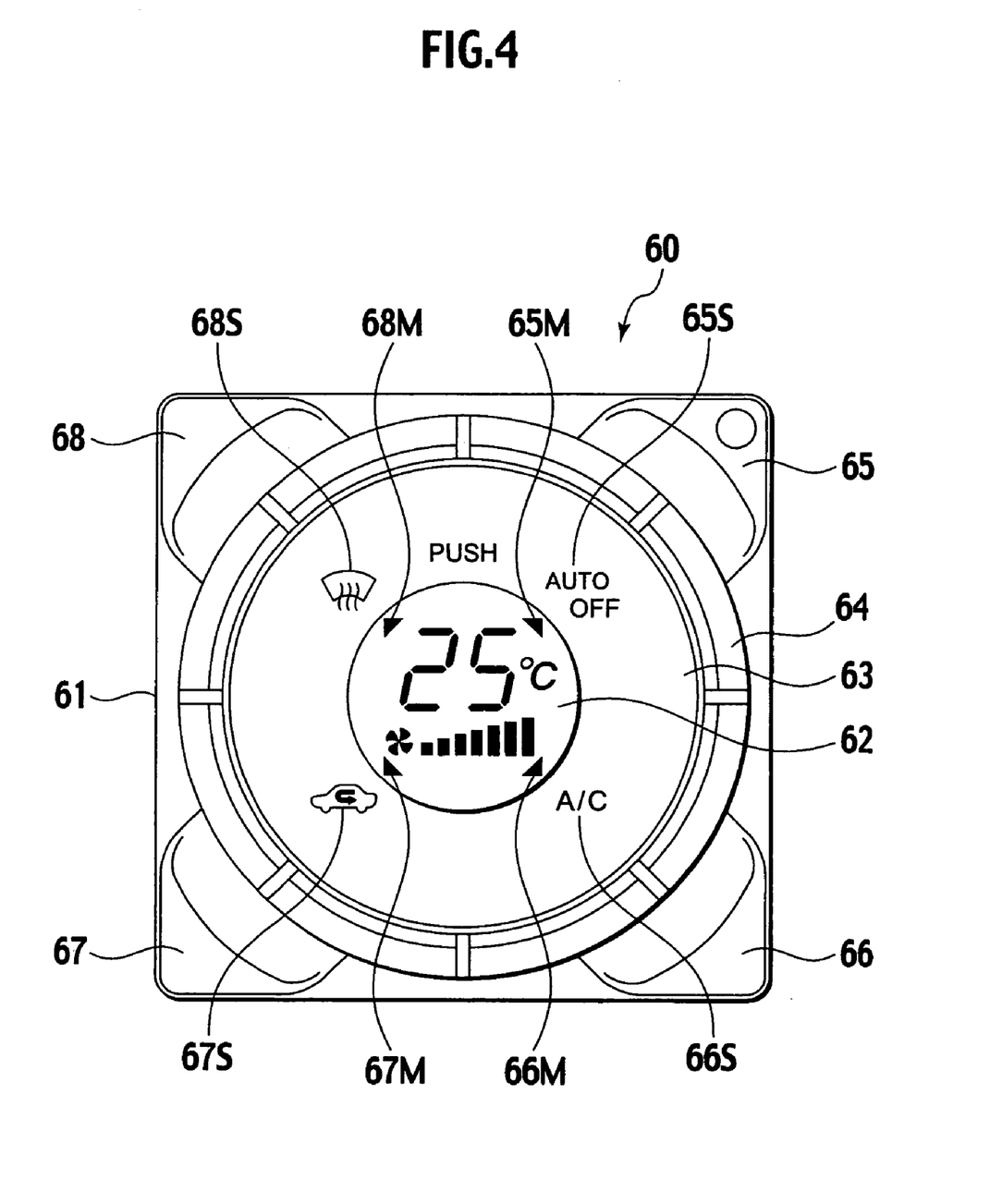
FIG. 4 is a front view showing an ON state of the control panel.

The control panel 60 will be explained with reference to FIG. 3. FIG. 3 is a front view showing the control panel 60 with the display thereof being OFF. FIG. 4 is a front view showing the control panel 60 with the display thereof being ON to show a main display part and arrow indicators.

The structure of the control panel 60 will be explained. In FIG. 3, the control panel 60 consists of a panel body 61, a base (not shown) fixed to the back of the panel body 61, the display 62, an outer frame (printed panel) 63 of the display 62, a dial 64, and switches 65 to 68.

In FIG. 3, the panel body 61 has a square periphery in a front view. The display 62, printed panel 63, dial 64, and switches 65 to 68 are attached to the panel body 61 or the base. The display 62 and printed panel 63 each have a circular shape. The display 62 and printed panel 63 are fitted to the annular dial 64 that is concentric with the display 62 and printed panel 63. Around the dial 64, the four switches 65 to 68 are radially arranged at equal intervals. The printed panel 63 is on an outer side of the display 62 and on an inner side of the switches 65 to 68. In the vicinities of the switches 65 to 68, the surface of the printed panel 63 is provided with symbols 65S to 68S. The symbols 65S, 66S, 67S, and 68S correspond to the switches 65, 66, 67, and 68, respectively, and represent one of the states of the corresponding switches.

The components 62, 64, and 65 to 68 of the control panel 60 will be explained in detail with reference to FIGS. 4 to 12. In FIGS. 9 to 12, the contents of the main display part, which is at the center of the display panel 62, are omitted.

Figure 5A:
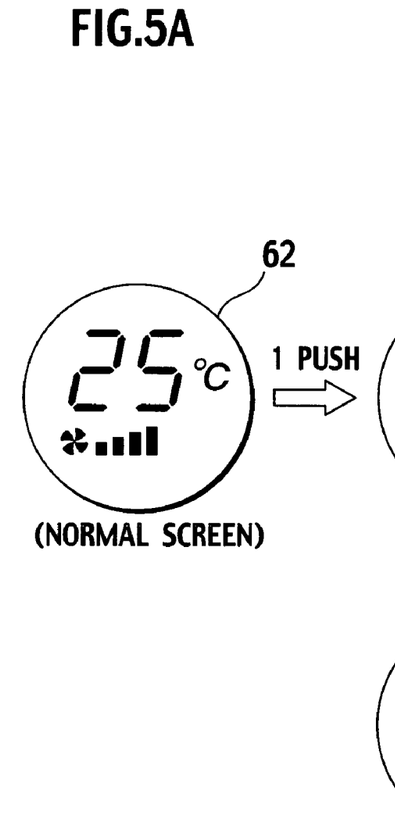
FIG. 5A shows a normal screen of the display and FIG. 5B shows screens for changing various settings.
Figure 5B:
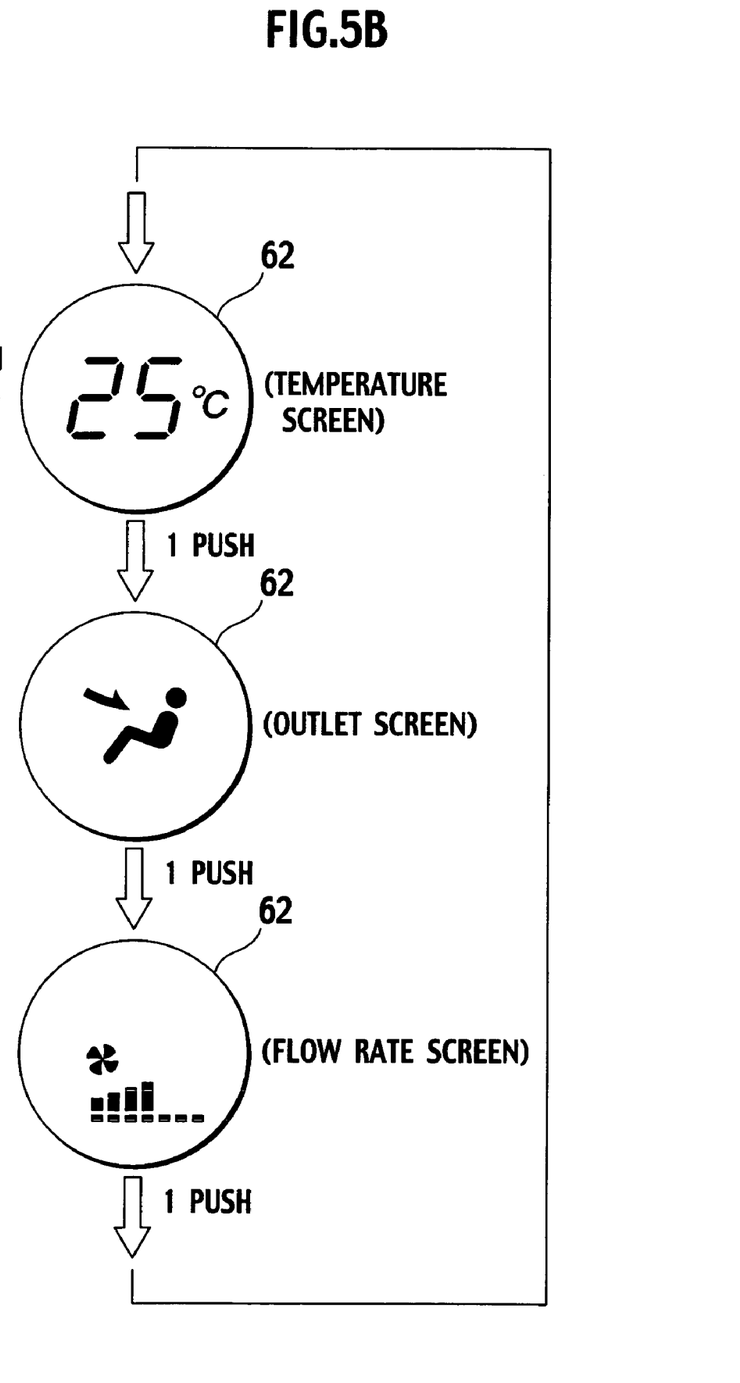

Display (FIGS. 4, 5A, and 5B)

The display 62 usually displays an operational state (set state) of the air conditioner as shown in FIG. 5A. In FIG. 5A, the display 62 displays the temperature and flow rate of conditioned air. To change the setting, a desired screen is displayed on the display 62 as shown in FIG. 5B.

For example, changing the temperature of conditioned air, an air temperature setting screen is displayed on the display 62 as shown in FIG. 5B. To change an outlet port, an outlet setting screen is displayed on the display 62 as shown in FIG. 5B. When changing an air flow rate, an air flow rate setting screen is displayed on the display 62 as shown in FIG. 5B. Along the periphery of the display 62, there are arrow indicators 65M to 68M as shown in FIG. 4, to indicate the symbols 65S to 68S of the switches 65 to 68. The arrow indicators 65M to 68M are turned on/off. The symbol 65S for the AUTO switch 65 is "AUTO." The symbol 66S for the AC switch 66 is "A/C." The symbol 67S for the inlet switch 67 is an icon indicating the recirculation of inside air. The symbol 68S for the DEF switch 68 is an icon indicating defrosting.

Figure 9A:
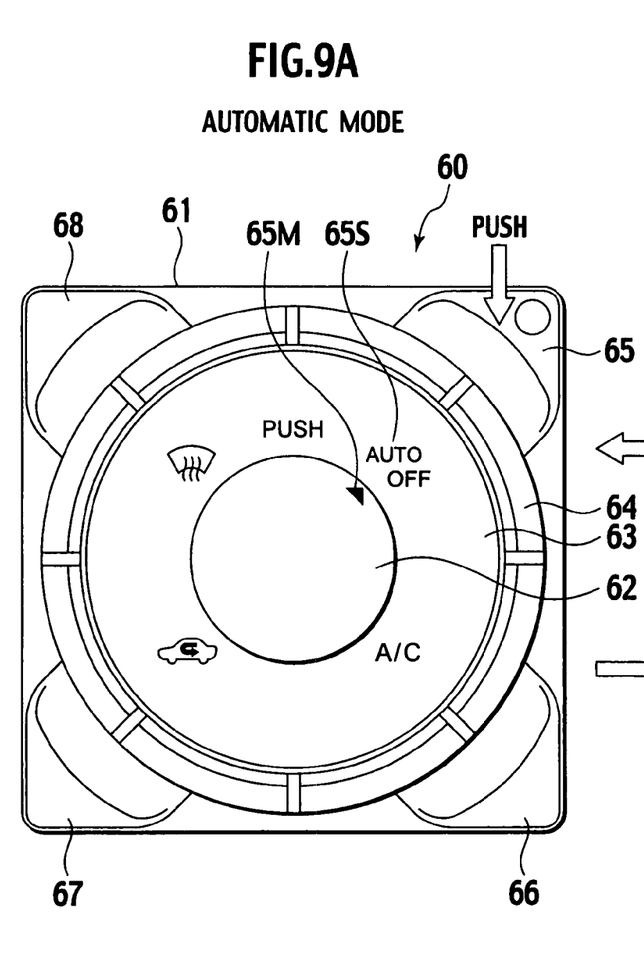
FIGS. 9A and 9B are front views showing correspondence between an AUTO switch, a symbol, and an arrow indicator on the control panel.
Figure 9B:
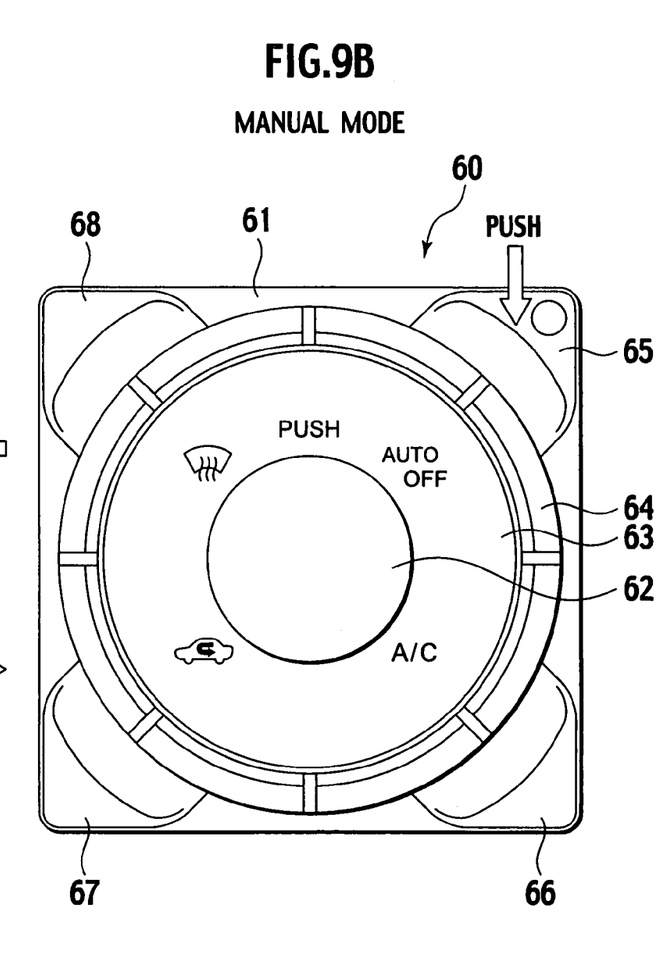

AUTO Switch (FIGS. 9A and 9B)

The AUTO switch 65 is used to switch the automatic mode and manual mode from one to another.

In FIG. 9A, the automatic mode is ON. If the AUTO switch 65 is pushed, the state of FIG. 9A changes to the state of FIG. 9B. Namely, the arrow indicator 65M pointing the symbol 65S of the AUTO switch 65 is turned off, to start the manual mode. If the AUTO switch 65 is pushed in the manual mode of FIG. 9B, the state of FIG. 9B changes to the state of FIG. 9A. Namely, the arrow indicator 65M is turned on to point to the symbol 65S of the switch 65, to start the automatic mode.

According to this embodiment, the AUTO switch 65 works as a power source switch. If the AUTO switch 65 is kept pressed for more than two seconds when the air conditioner is stopped, the air conditioner starts in the automatic mode. If the AUTO switch 65 is kept pressed for more than two seconds when the air conditioner is operating in any one of the automatic and manual modes, the air conditioner stops.

Figure 10A:
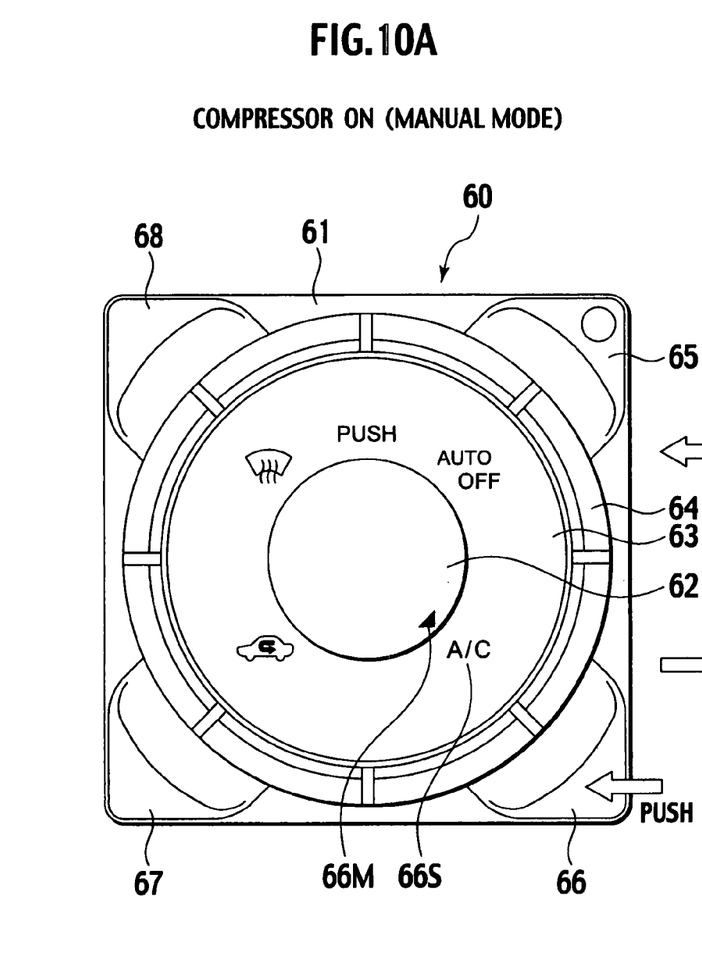
FIGS. 10A and 10B are front views showing correspondence between an AC switch, a symbol, and an arrow indicator on the control panel.
Figure 10B:
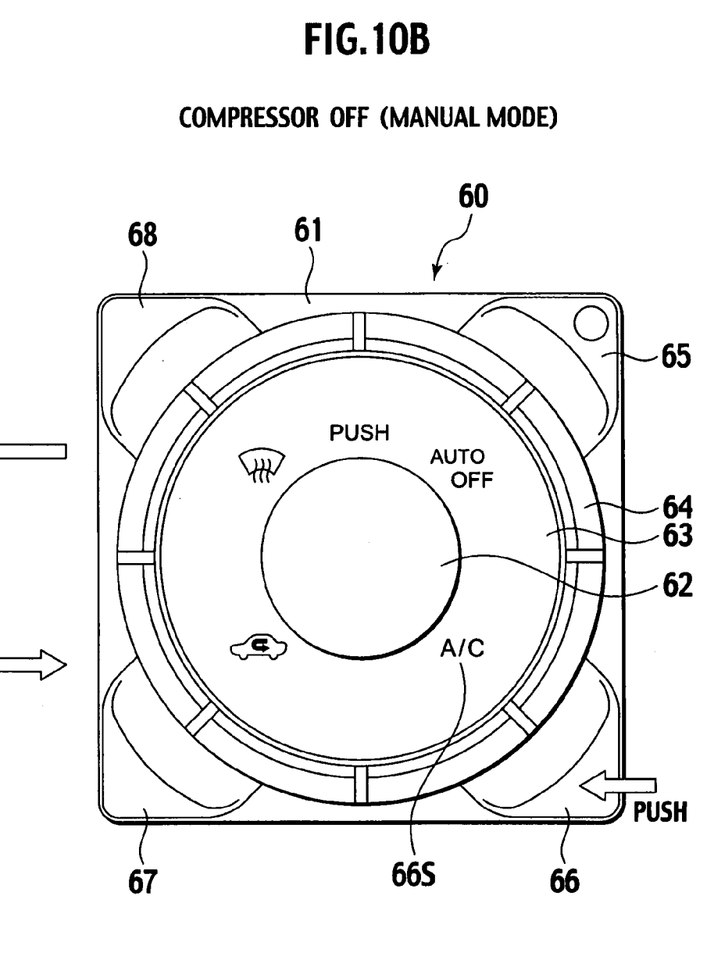

AC Switch (FIGS. 10A and 10B)

The AC switch 66 is used to turn on/off the magnet clutch 48 to start/stop the compressor 46.

In FIG. 10A, the arrow indicator 66M pointing the symbol 66S of the AC switch is ON to indicate that the compressor 46 is operating. If the AC switch 66 is pushed, the state of FIG. 10A changes to the state of FIG. 10B. Namely, the arrow indicator 66M turns off and the compressor 46 stops. If the AC switch 66 is pushed when the arrow indicator 66M is OFF as shown in FIG. 10B, the state of FIG. 10B changes to the state of FIG. 10A. Namely, the arrow indicator 66M turns on and the compressor 46 starts. If the AC switch 66 is pushed during the automatic mode, the compressor 46 stops and the manual mode starts. If the AC switch 66 is again pushed, the compressor 46 starts and the automatic mode starts. If the AC switch 66 is pushed during the manual mode, the manual mode is unchanged and the compressor 46 starts or stops, depending on the prior operation.

Figure 11A:
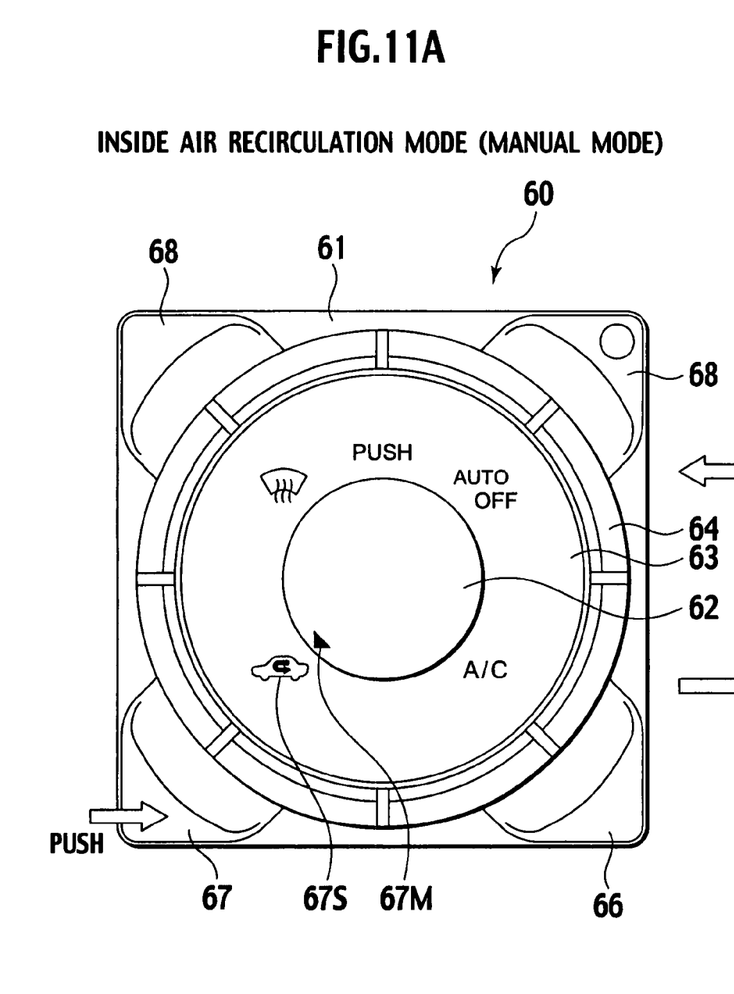
FIGS. 11A and 11B are front views showing correspondence between an inlet port switch, a symbol, and an arrow indicator on the control panel.
Figure 11B:
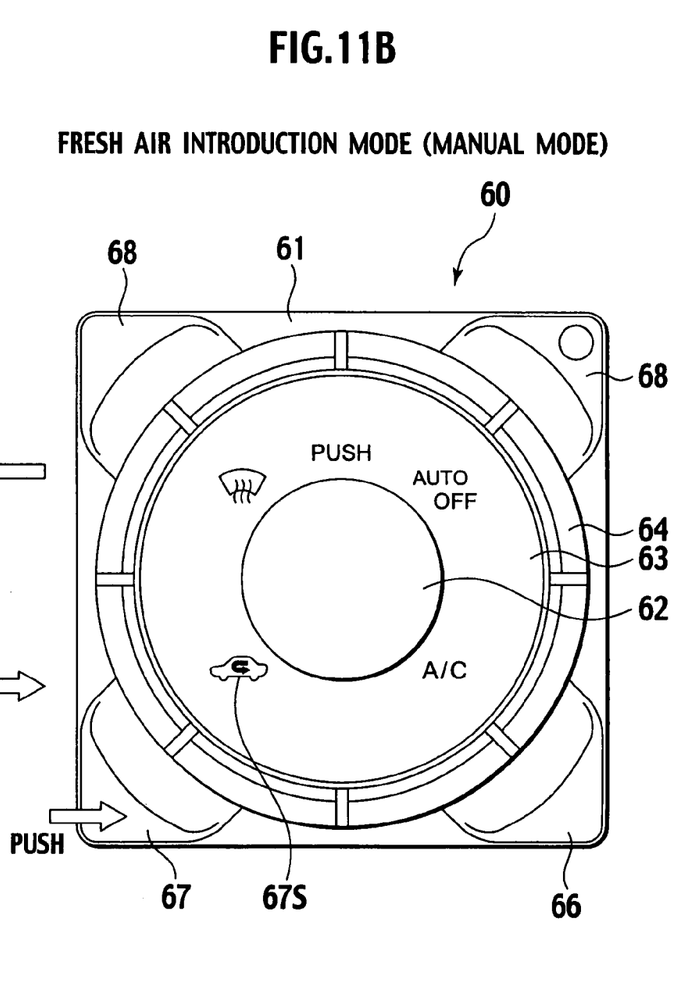

Inlet Switch (FIGS. 11A and 11B)

The inlet switch 67 is used to select the recirculation of inside air (REC) or the introduction of fresh air (FRE).

In FIG. 11A, the arrow indicator 67M pointing to the symbol 67S of the inlet switch 67 is ON to indicate the inside air recirculation mode. If the inlet switch 67 is pushed in this state, the state of FIG. 11A changes to the state of FIG. 11B. Namely, the arrow indicator 67M is turned off and the intake door 30 is changed to introduce fresh air (FRE). If the intake switch 67 is pushed in the state of FIG. 11B in which the arrow indicator 67M is OFF, the state of FIG. 11B changes to the state of FIG. 11A. Namely, the arrow indicator 67M is turned on and the intake door 30 is changed to circulate inside air (REC). During the automatic mode, the switching of the intake door 30 is automatically controlled. If the inlet switch 67 is pushed during the automatic mode, the automatic control of the intake door 30 is terminated, and the intake door 30 is positioned to circulate an inside air or introduce fresh air. In this state, the other components including the air mix door 34, mode doors 38, fan 42, and compressor 46 are automatically controlled in a semiautomatic mode. If the inlet switch 67 is kept pressed for more than two seconds while the unit is in the semiautomatic mode, the arrow indicator 67M is turned on and off twice to start the automatic mode.

Figure 12A:
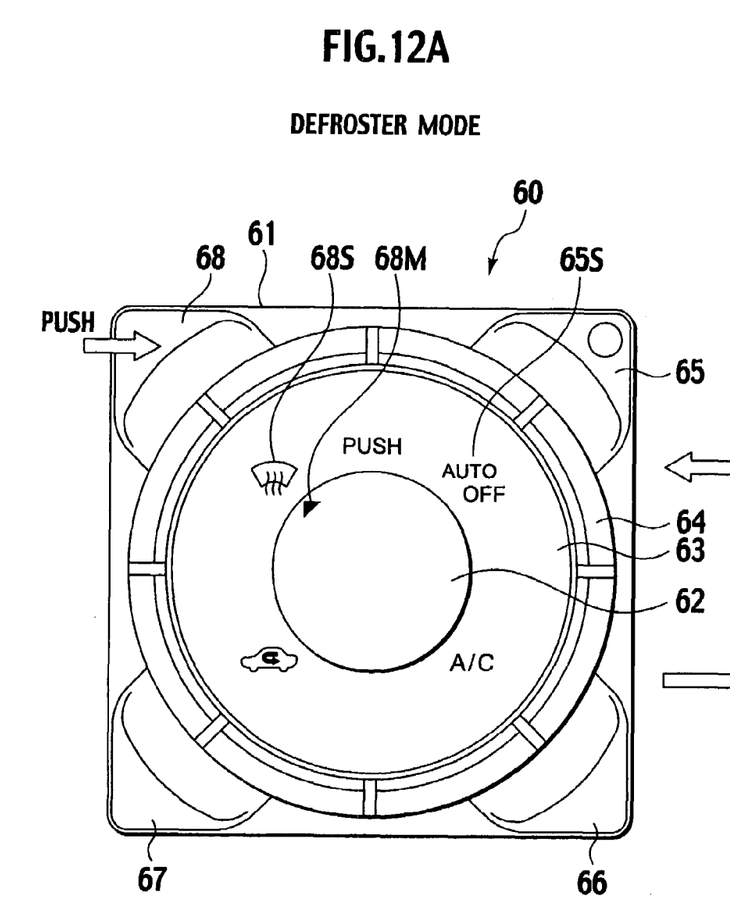
FIGS. 12A and 12B are front views showing correspondence between a DEF switch, a symbol, and an arrow indicator on the control panel.
Figure 12B:
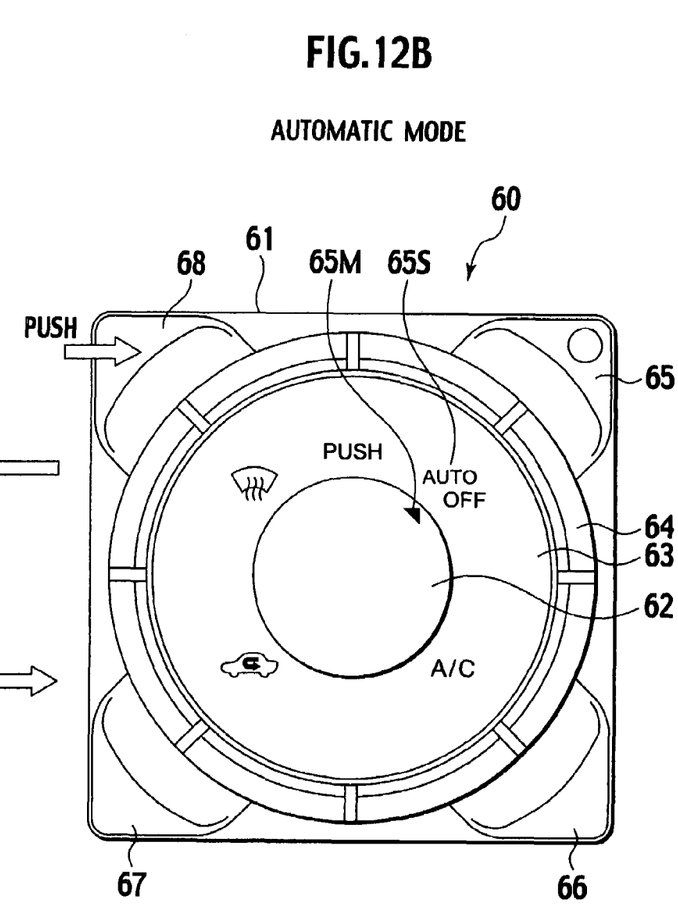

DEF Switch (FIGS. 12A and 12B)

The DEF switch 68 is used to forcibly start a defrost mode.

If the DEF switch 68 is pushed during the automatic mode of FIG. 12B, the state of FIG. 12B changes to the state of FIG. 12A. Namely, the arrow indicator 65M pointing to the symbol 65S of the AUTO switch 65 is turned off, the arrow indicator 68M pointing to the symbol 68S of the DEF switch 68 is turned on, and the defrost mode starts to defrost the front window. If the DEF switch 68 is pushed during the manual mode, the arrow indicator 68M pointing the symbol 68S of the DEF switch 68 is turned on, and the defrost mode starts to defrost the front window. In the defrost mode, only the defrost outlet 19 opens, the fresh air inlet 9 is maintained, and the compressor 46 is driven.

If the DEF switch 68 is again pushed in FIG. 12A, the state of FIG. 12A changes to the state of FIG. 12B. Like the AUTO switch 65, the DEF switch 68 serves as a power source switch. If the DEF switch 68 is kept pressed for more than two seconds when the air conditioner is stopped, the air conditioner starts in the defrost mode.

Dial (FIGS. 4 to 8)

Figure 6:
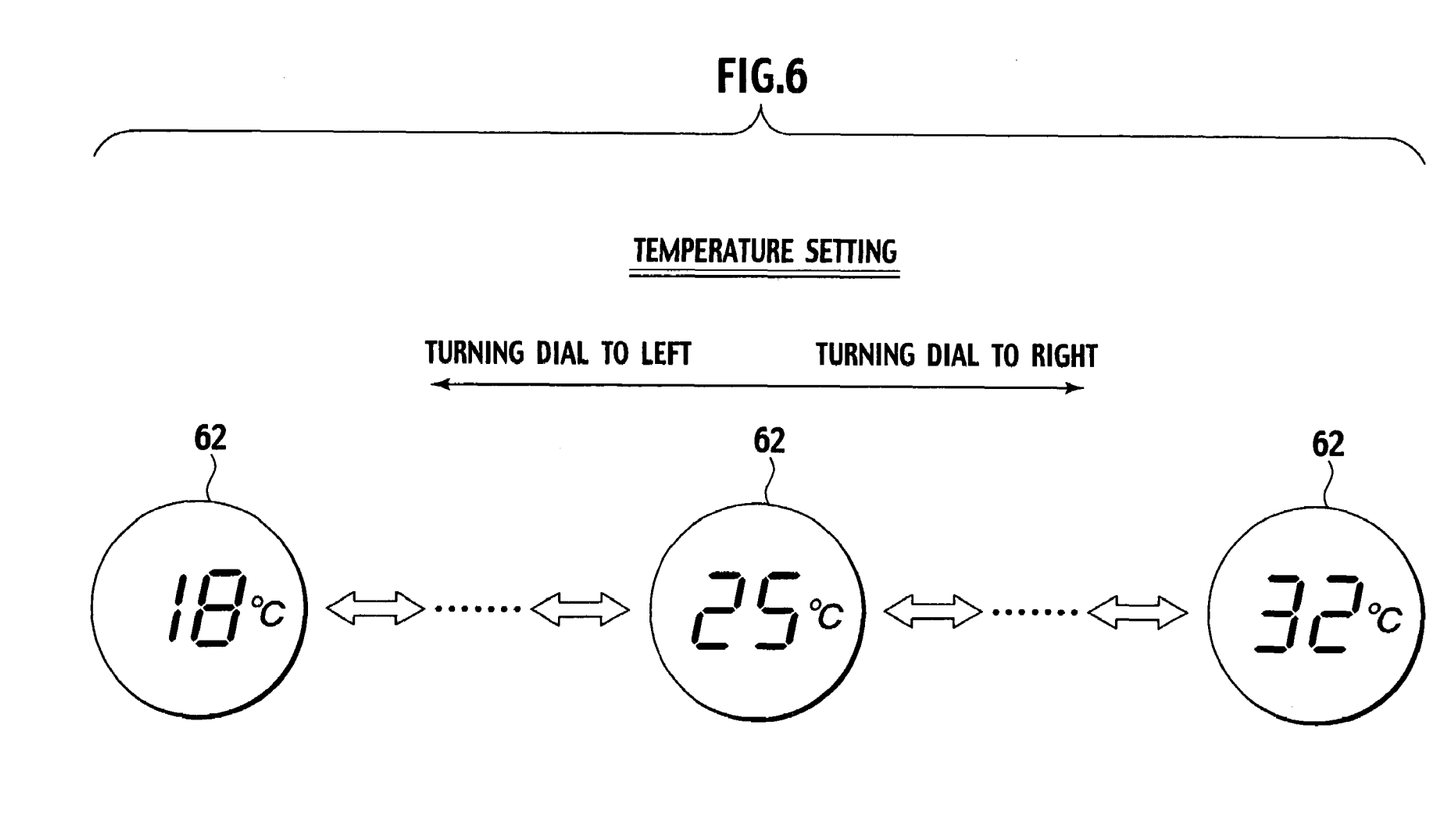
FIG. 6 shows screens of the display for changing an outlet air temperature.
Figure 7:
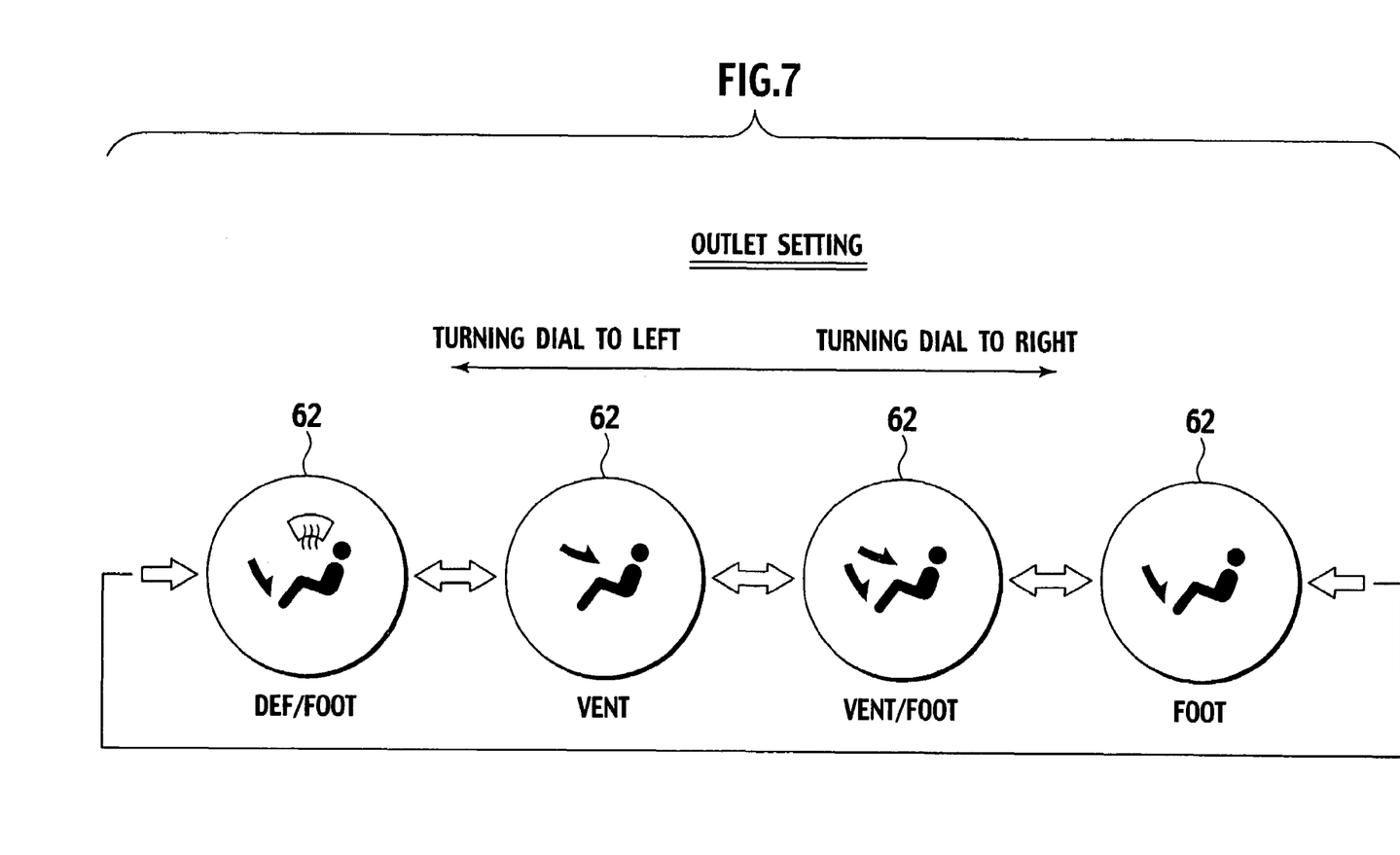
FIG. 7 shows screens of the display for changing an outlet port.
Figure 8:
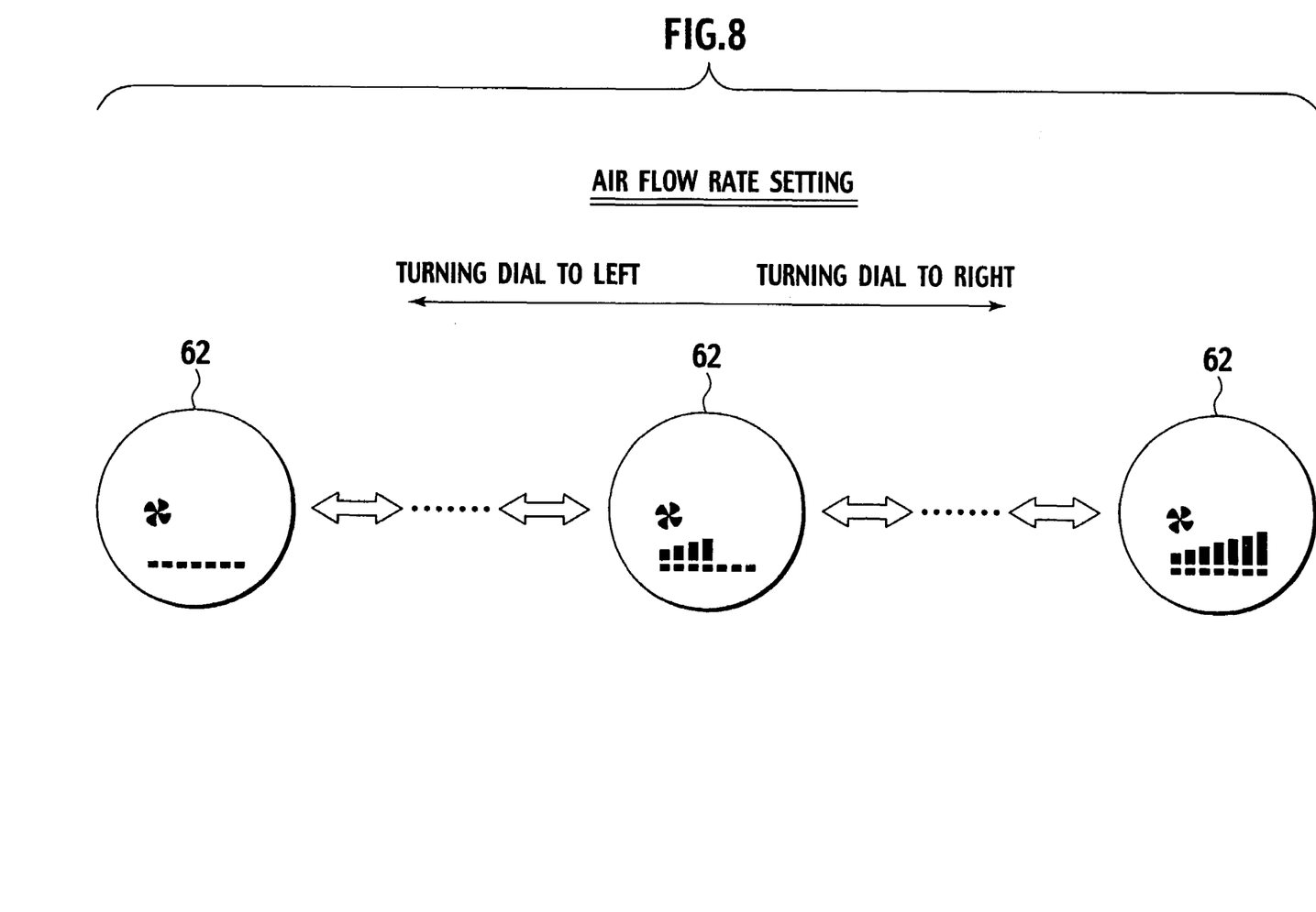
FIG. 8 shows screens of the display for changing an air flow rate.

The dial 64 is arranged to be turned and pushed, to change an outlet air temperature, an air outlet port, and an air flow rate. As shown in FIG. 5B, the dial 64 can be pushed to select an object to set (any one of the outlet air temperature, air outlet port, and air flow rate), and then, the dial 64 can be turned to change the setting of the selected object as shown in FIGS. 6 to 8. According to this embodiment, the display 62 can be pushed together with the dial 64.

To change an outlet air temperature, the display 62 displaying the normal screen of FIG. 5A or the dial 64 is pushed once to display the air temperature setting screen of FIG. 5B. Thereafter, the dial 64 is turned to set a desired outlet air temperature. More precisely, as shown in FIG. 6, the dial 64 is turned (rotated) to the left and right to change an outlet air temperature by a predetermined rate (in this example, in increments of 0.5° C. by 0.5° C.). At this time, the automatic or manual mode is unchanged.

To change the outlets 15, 17, and 19 from one to another, the display 62 displaying the normal screen of FIG. 5A or the dial 64 is pushed twice to display the outlet setting screen of FIG. 5B. Thereafter, as shown in FIG. 7, the dial 64 is turned to the left and right to change the outlets from one to another and select a desired outlet. If an outlet is changed to another outlet during the automatic mode, the automatic mode changes to the manual mode and the arrow indicator 65M pointing the symbol 65S of the AUTO switch 65 is turned off.

To change an air flow rate, the display 62 displaying the normal screen of FIG. 5A or the dial 64 is pushed thrice to display the air flow rate setting screen of FIG. 5B. Thereafter, as shown in FIG. 8, the dial 64 is turned to the left and right to change an air flow rate step by step to a desired flow rate. If an air flow rate is changed during the automatic mode, the automatic mode changes to the manual mode and the arrow indicator 65M pointing the symbol 65S of the AUTO switch 65 is turned off.

EFFECTS OF THE EMBODIMENT

The control panel 60 according to the embodiment includes a switch (65, 66, 67, or 68, the display (62) arranged adjacent to the switch, and the arrow indicator (65M, 66M, 67M, or 68M) that is arranged in the display and is turned on/off to point to the switch. The arrow indicator indicates whether the switch is in an ON state or in an OFF state. This configuration eliminates light emitting indicators such as light emitting diodes disclosed in, for example, FIG. 3 of the Japanese Unexamined Patent Application Publication No. 2001-97027, thereby reducing the manufacturing cost of the control panel.

Figure 13:
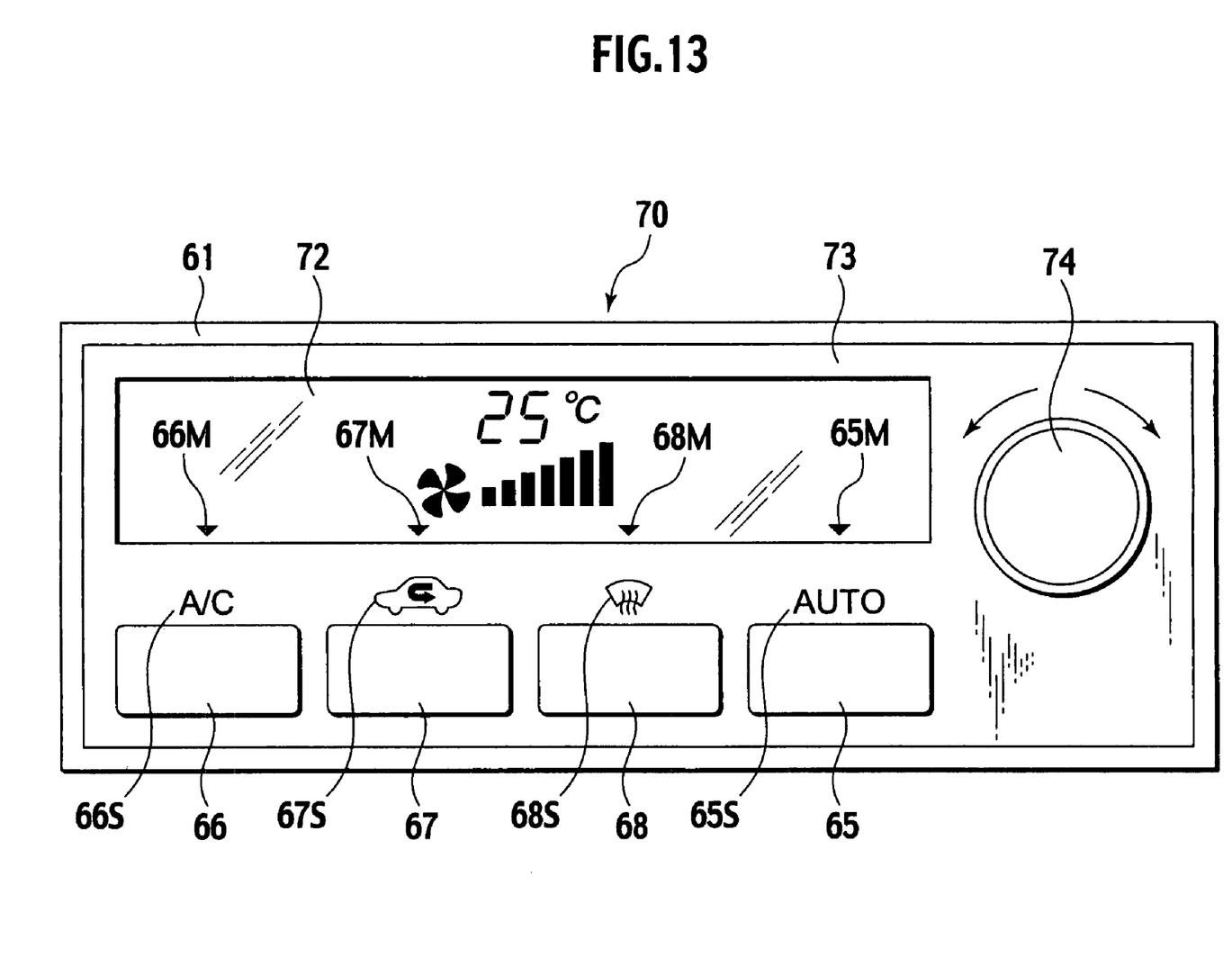
FIG. 13 is a front view showing a control panel according to another embodiment of the present invention.

The arrow indicators are applicable to a control panel 70 shown in FIG. 13 according to another embodiment of the present invention. The control panel 70 employs a rectangular display 72 with switches 65 to 68 arranged adjacent to the display 72.

The symbols 65S to 68S provided for the switches 65 to 68 permit the switches 65 to 68 to be easily identifiable.

The symbols are not directly formed on the switches, and therefore, the switches may have the same shape and may be usable just as any of the switches 66 to 68.

The display 62 is circular and the switches 65 to 68 are radially arranged around the display 62. Compared with conventional control panels, the design of the control panel of the embodiment is novel so as to increase market value.

The control panel 60 according to the embodiment includes the rotatable dial 64 that is turned to change the setting of an object selected from among a plurality of objects (for example, an outlet air temperature, an air flow rate, and an outlet port). Namely, the single dial 64 can change the settings of the plurality of objects without providing separate dials for the objects, respectively. This results in reducing the size of the control panel 60.

The dial 64 of the control panel 60 according to the embodiment can be turned and pushed as shown in FIGS. 5A to 8. By pushing the dial 64, a passenger can select one of the objects (for example, outlet air temperature, air flow rate, and outlet port), and by turning the dial 64, the passenger can change the setting of the selected object. Namely, the dial 64 can function as a "select button" to select one of a plurality of objects to be set. The embodiment has no need of preparing "select button" in addition to the dial 64, and therefore, can reduce the size of the control panel 60.

According to the embodiment, the objects to be set include an air flow rate, an outlet air temperature, and an outlet port. The dial 64 is capable of singly controlling these three objects that generally involve three or more steps of operation. The embodiment, therefore, can minimize the size of the control panel 60.

The display 62 is arranged on an inner side of the dial 64. This configuration allows the control panel 60 to be compact and the dial 64 to have a size suitable for a human hand.

The display 62 can display the setting state (set value) of an object selected from among a plurality of objects (outlet air temperature, air flow rate, and outlet port) as shown in FIGS. 5A to 8. Consequently, one can visually confirm a change made with the dial 64 on the display 62 that is in the vicinity of the dial 64.

The display 62 has a circular shape and the dial 64 is concentric with and annular around the display 62. This layout is highly effective.

Although the present invention has been described above by reference to certain embodiments of the present invention, the present invention is not limited to the embodiments. Modification and variation of the embodiments can be made without departing from the spirit or scope of appended claims. The embodiments are only for illustrative purposes and are not intended to limit the present invention.

For example, the embodiment mentioned above uses the dial 64 also as a select button. Instead, a separate select button may be provided. In this case, the dial may not be a push button, and the display may be a push button to serve as the select button. Alternatively, the select button may be provided separately from the dial and display.

According to the embodiment, the display has a circular shape and the dial is concentric with and annular around the display. The display and dial may each have an elliptic shape, or a rectangular shape, or any other shape. The inner circumferential edge of the dial may not be extended along the outer circumferential edge of the display. The display may not be arranged on an inner side of the dial.

The display may be any display, such as a liquid crystal display (LCD) and a vacuum fluorescent display (VFD).

According to the embodiment, the display normally shows only an outlet air temperature and an air flow rate. The display may normally show an outlet air temperature, an air flow rate, and an outlet port.

According to the embodiment, a symbol is placed on an inner side of a corresponding switch. The symbol may be placed on the corresponding switch itself.

What is claimed is:

1. A control panel for a vehicle air conditioner, comprising:
 a select button configured to be pushed to select any of a plurality of objects;
 a dial configured to be turned to change a setting of an object selected by the select button; and
 a screen display arranged on an inner side of the dial and configured to be able to screen-display all of the settings of the plurality of objects.

2. A control panel for a vehicle air conditioner, comprising:
 a dial configured to be turned and pushed, the dial being pushed to select any of a plurality of objects and turned to change a setting of the selected object; and
 a screen display arranged on an inner side of the dial and configured to be able to display all of the settings of the plurality of objects.

3. The control panel of claim 1, wherein:
 the plurality of objects includes at least two of an air flow rate, an outlet air temperature, and an outlet port mode.

4. The control panel of claim 2, wherein:
 the screen display is configured, when one of the plurality of objects is selected, to screen-display the setting of the selected object.

5. The control panel of claim 2, wherein:
 the screen display is configured, before one of the plurality of objects is selected, to screen-display more than two of the settings of the plurality of objects, and, when one of the plurality of objects is selected, to screen-display the setting of the selected object without displaying the settings of the other objects.

6. The control panel of claim 2, wherein:
 the screen display is circular; and
 the dial is annular and is concentric with the screen display.

7. The control panel of claim 2, further comprising:
 at least one of a switch configured to switch between an automatic mode and a manual mode, a switch configured to turn on/off a compressor configured to circulate a coolant through an evaporator serving as a cooler, a switch configured to switch between recirculation of inside air and introduction of fresh air, and a switch configured to switch an outlet port mode to a defroster mode, the at least one switch being arranged on an outer side of the screen display;
 a symbol configured to represent the at least one switch, the symbol being arranged at a position corresponding to the at least one switch, the position being on an outer side of the screen display and on an inner side of the at least one switch; and
 an arrow indicator screen-displayed by the screen display and configured to be turned on/off to point to the symbol.

8. A control panel for a vehicle air conditioner, comprising:
 a switch configured to be pushed to change a setting of an object;
 a screen display adjacent to the switch; and
 an arrow configured to be screen-displayed by the screen display and configured to be turned on/off to point to the switch.

9. A control panel for a vehicle air conditioner, comprising:
 at least one of a switch configured to switch between an automatic mode and a manual mode, a switch configured to turn on/off a compressor configured to circulate a coolant through an evaporator serving as a cooler, a switch configured to switch between recirculation of inside air and introduction of fresh air, and a switch configured to switch an outlet port mode to a defroster mode;
 a screen display adjacent to the at least one switch; and
 an arrow indicator configured to be screen-displayed by the screen display and configured to be turned on/off to point to the at least one switch.

10. The control panel of claim 9, further comprising:
 a symbol representative of the at least one switch, the symbol being arranged on the at least one switch or at a position that is closer to the screen display from the at least one switch.

11. The control panel of claim 10, wherein:
 the screen display is circular; and
 a plurality of switches including the at least one switch is radially arranged around the screen display.

* * * * *